Jan. 5, 1937.   R. W. GORTON   2,066,342
CAMPING EQUIPMENT
Filed Nov. 17, 1934   6 Sheets-Sheet 3
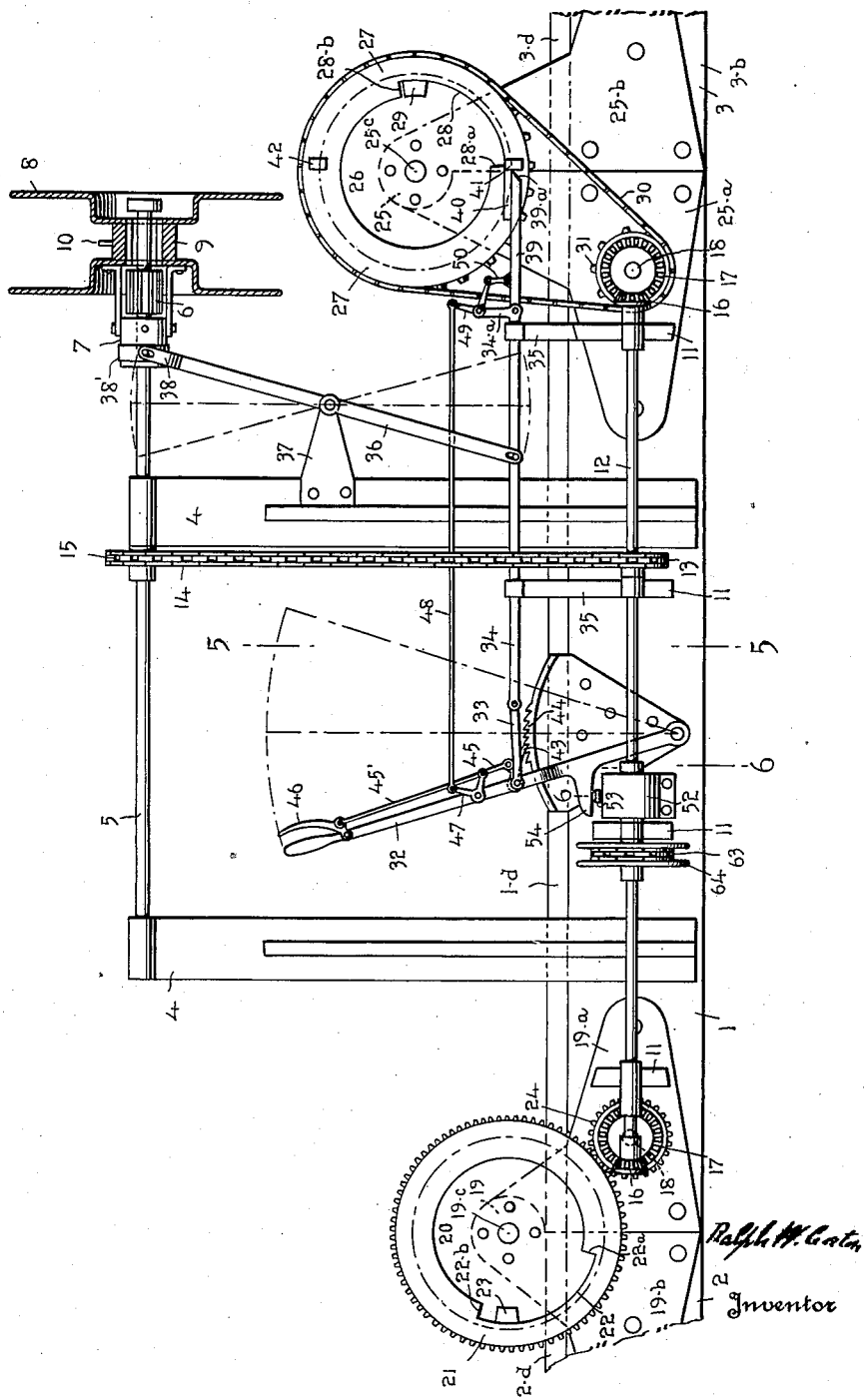

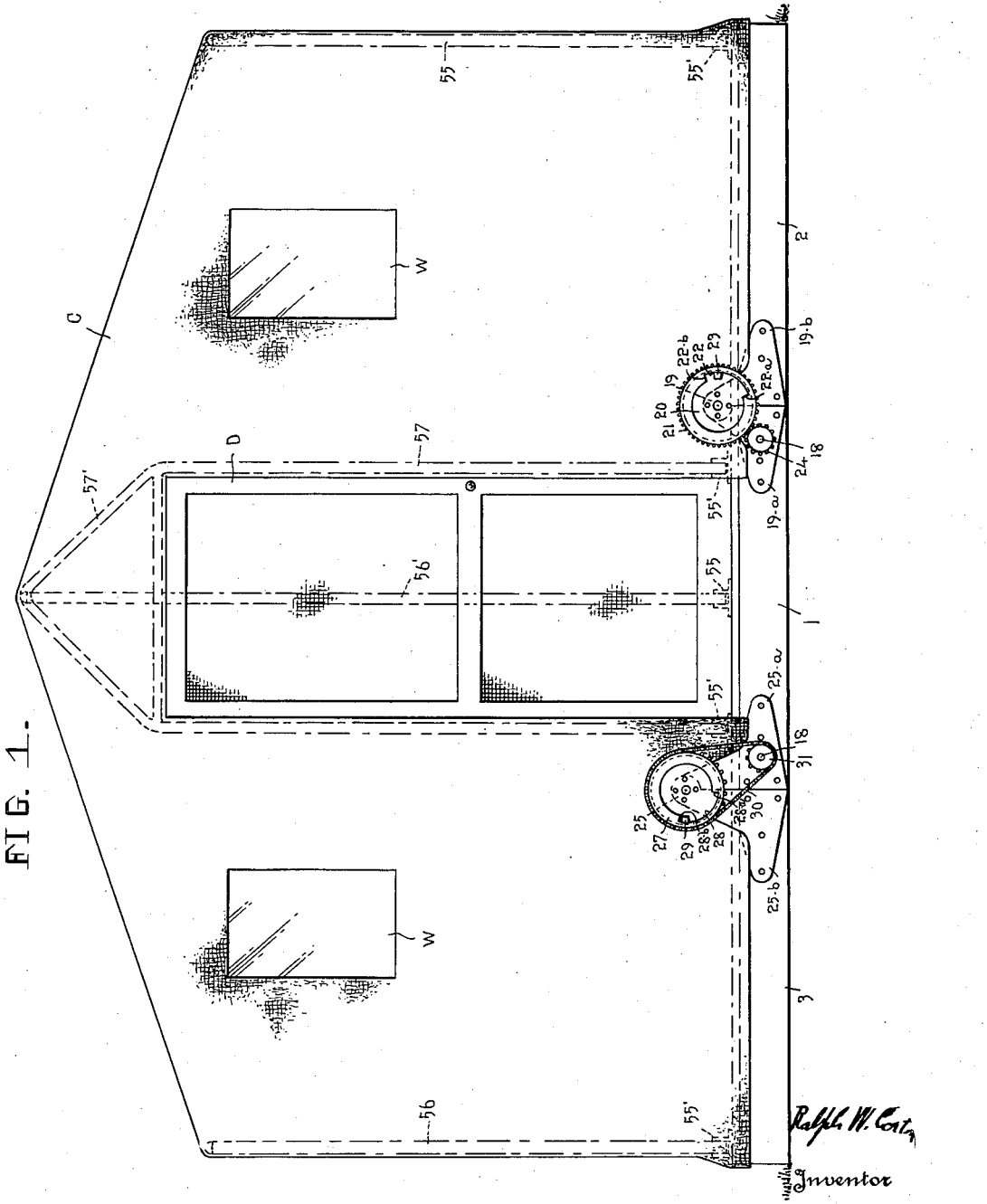

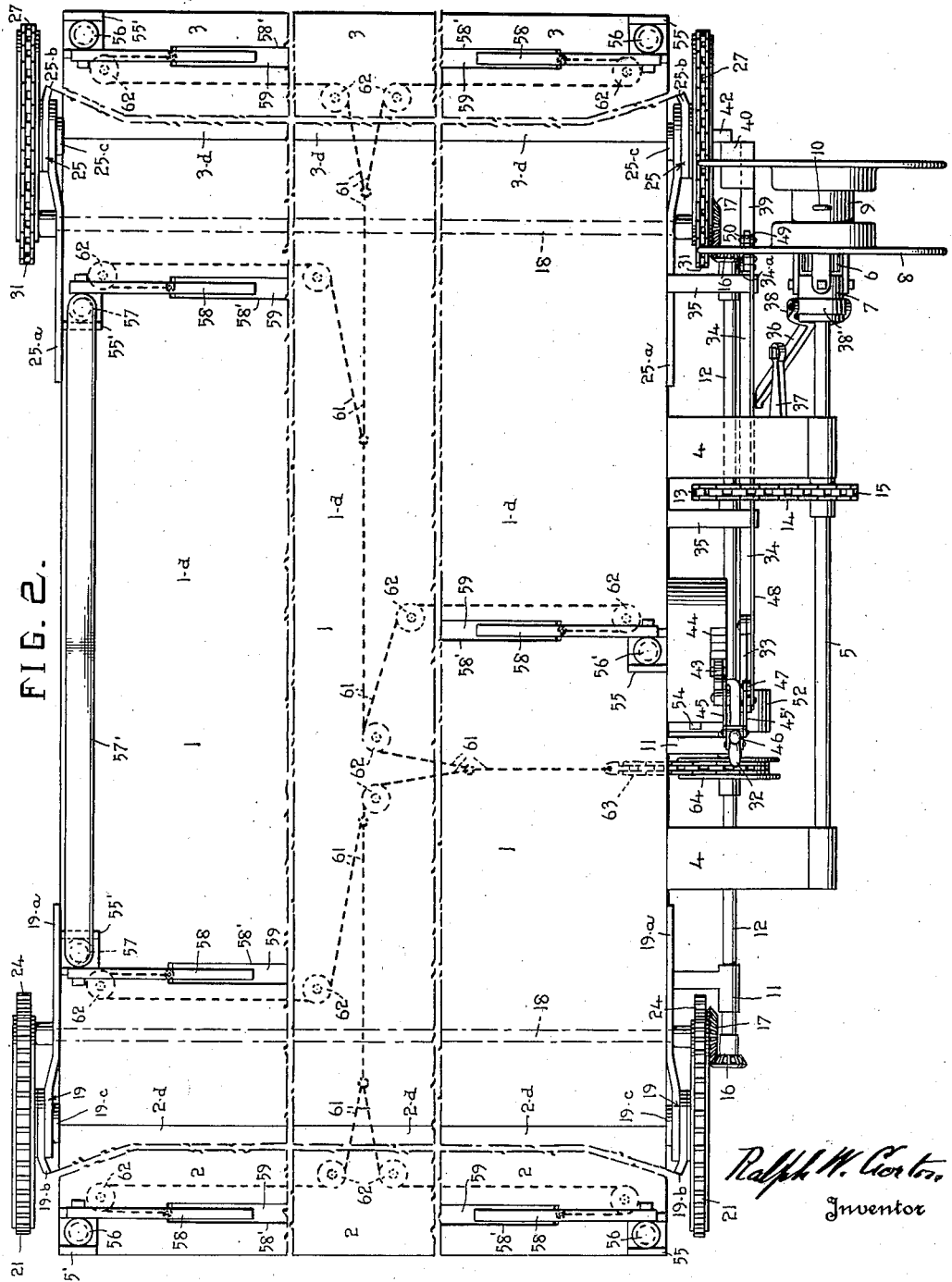

Jan. 5, 1937.    R. W. GORTON    2,066,342
CAMPING EQUIPMENT
Filed Nov. 17, 1934    6 Sheets-Sheet 4
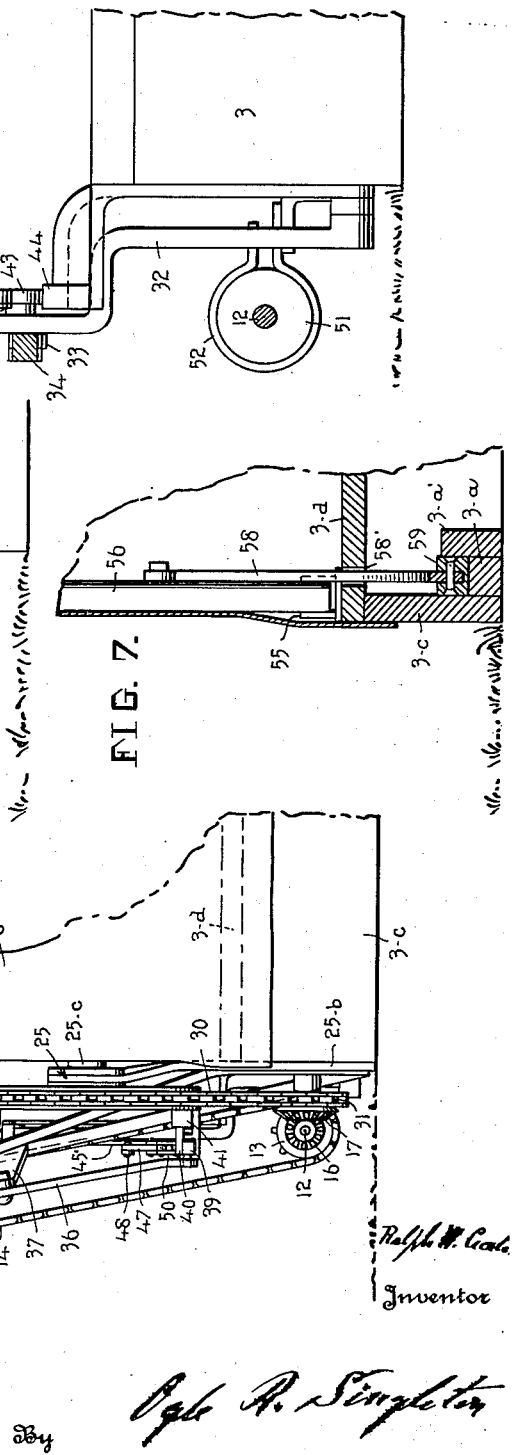
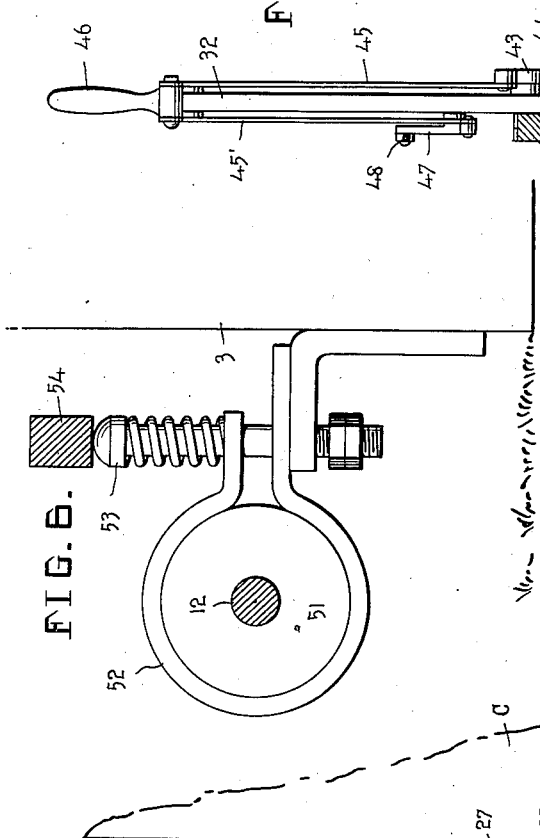

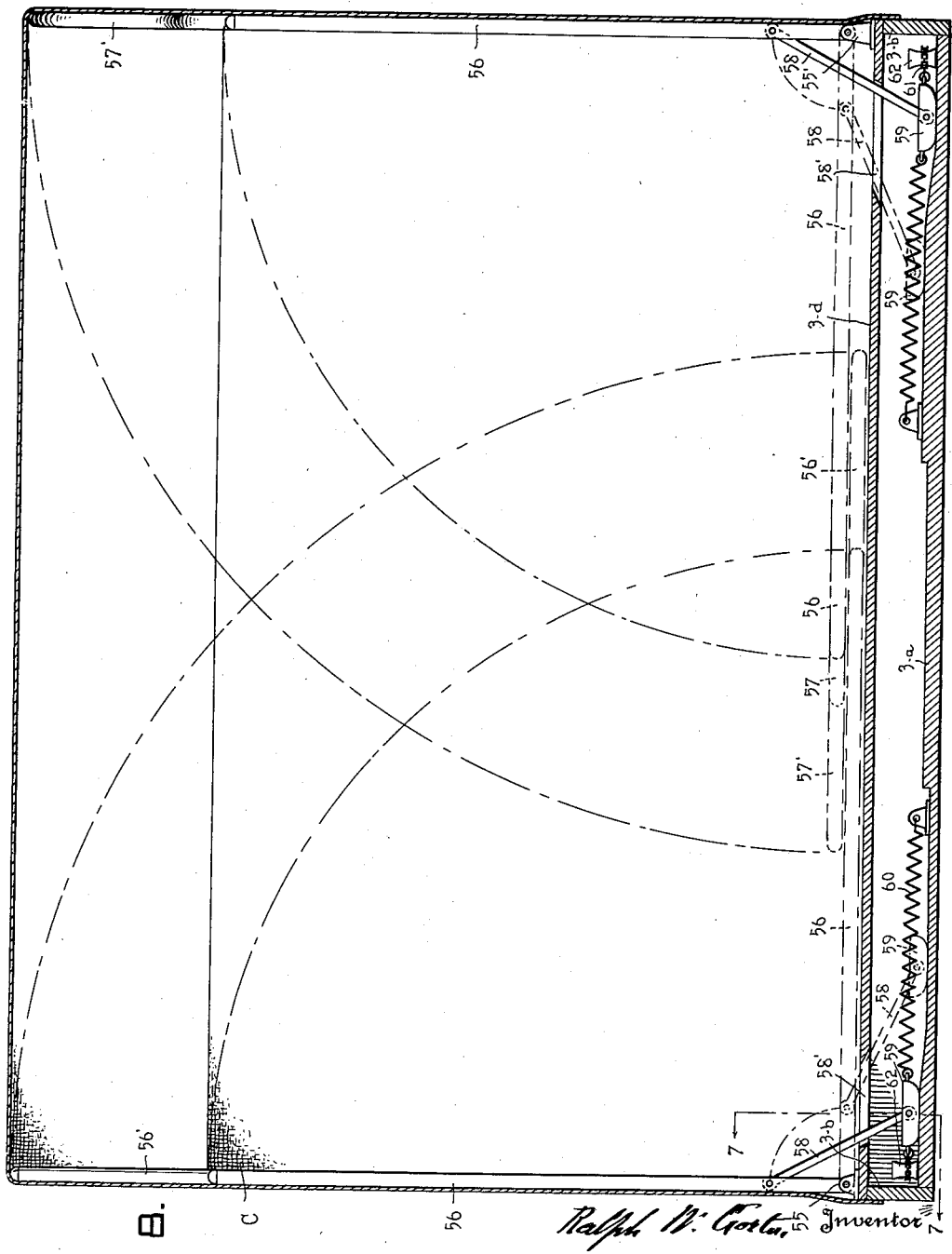

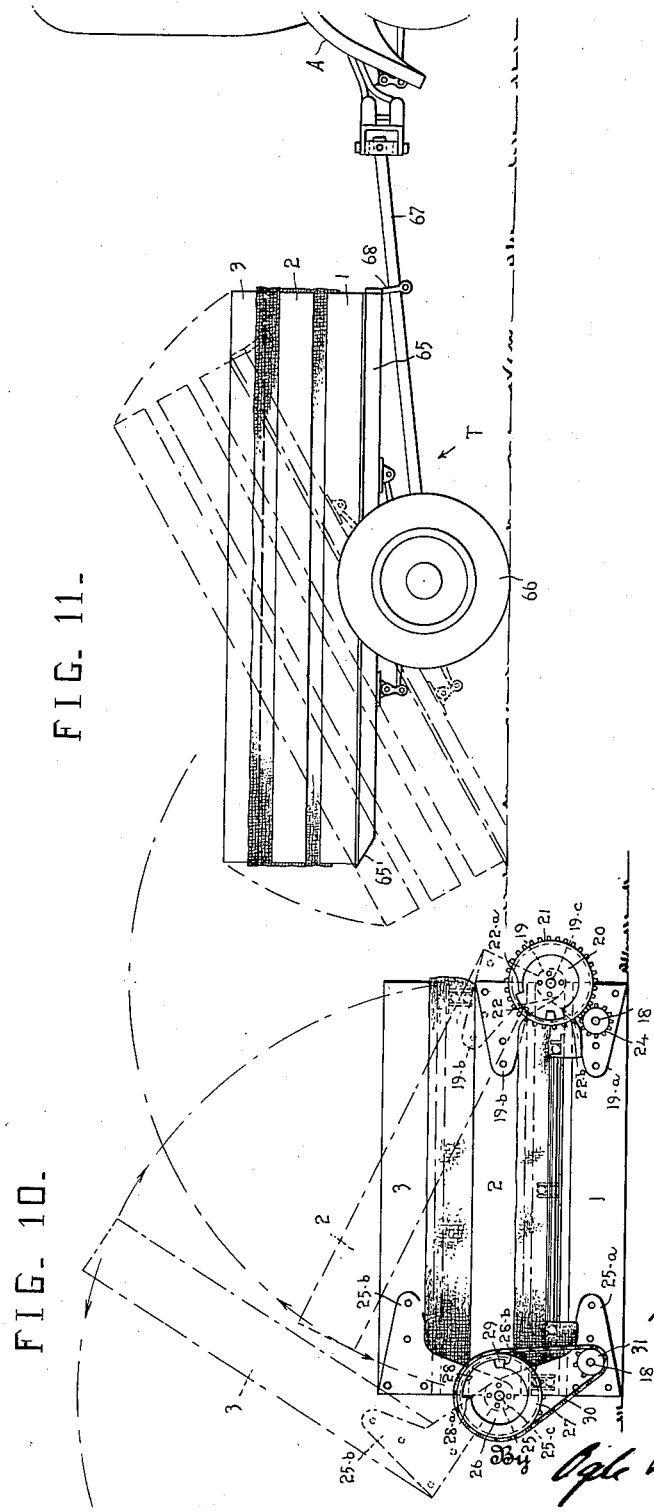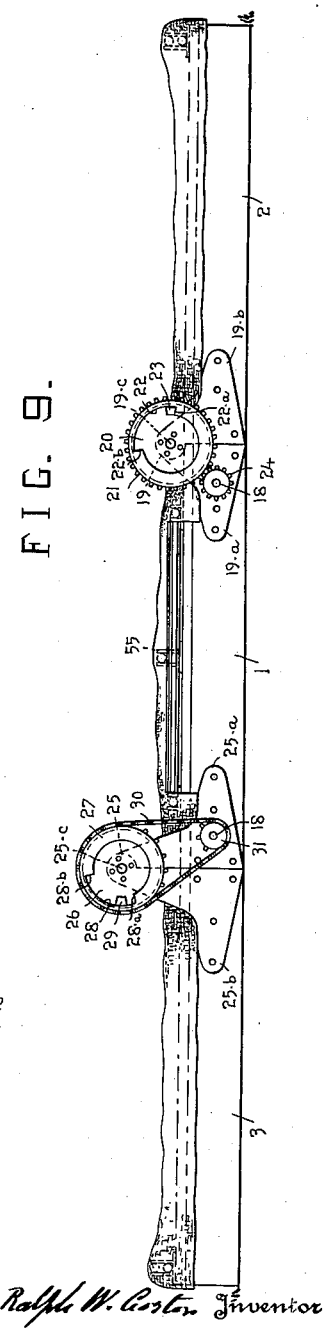

Patented Jan. 5, 1937

2,066,342

UNITED STATES PATENT OFFICE 2,066,342

CAMPING EQUIPMENT

Ralph W. Gorton, Newport, Vt.

Application November 17, 1934, Serial No. 753,490

20 Claims. (Cl. 135—1)

My invention consists in a new and useful improvement in camping equipment and is designed to provide a camping house having a solid floor, and walls and roof composed of flexible material such as canvas, and which may be folded into a comparatively small compass, so that it can be transported on a small trailer towed by an automobile. My device is provided with operating mechanism for collapsing and erecting the house, which is actuated by power supplied by the movement of the automobile. Thus the user can unload the device at the spot where he desires to camp and quickly and easily convert the folded device into a camping house, by merely attaching the ordinary towing cable to the operating mechanism of the device and to the automobile, and moving the automobile a short distance, thereby applying power to the mechanism. The mechanism causes the sections of the solid base to unfold and the flexible walls and roof to rise into their proper positions, and then locks the entire device in open position. The particularly novel and useful features of my device are the design and association of the various portions of the base and superstructure to form the complete camping house, and the operating mechanism whereby the solid base is folded and unfolded and the walls and roof are caused to rise and subside, all being accomplished by merely the power exerted on the mechanism by the towing cable.

It will be seen that my improved device provides an entirely adequate camping house of extremely economical and sturdy construction, as the solution of the problem of automobile campers who desire a portable camp. My device supplies all the requisites found in the rigid, portable house mounted upon a trailer for towing behind automobiles, when it has been erected, but it has none of the disadvantages of unwieldy bulk while being transported, since it is completely folded into comparatively small compass during transportation. Likewise, while having all the advantages for transportation of a collapsible flexible tent, it requires none of the laborious operations required for erecting the ordinary type of collapsible tent, since it may be quickly and easily erected by the use of the power supplied by the automobile.

While I have illustrated in the drawings filed herewith and have hereinafter fully described one specific embodiment of my invention, it is to be distinctly understood that I do not consider my invention limited to said specific embodiment, but refer for its scope to the claims appended hereto.

In the drawings:

Fig. 1 is a front elevation of the device in open position.

Fig. 2 is a top plan view of the base in open position, the collapsible walls and roof being removed.

Fig. 3 is an enlarged rear elevation of a portion of the base in open position and the operating mechanism.

Fig. 4 is an enlarged end elevation of the operating mechanism.

Fig. 5 is an enlarged vertical section on the line 5—5 of Fig. 3.

Fig. 6 is an enlarged vertical section on the line 6—6 of Fig. 3.

Fig. 7 is an enlarged vertical section on the line 7—7 of Fig. 8.

Fig. 8 is a longitudinal vertical section of the device, the operating mechanism being omitted.

Fig. 9 is a front elevation of the device, the base being open and the collapsible walls and roof being collapsed thereon.

Fig. 10 is a front elevation of the device in closed position.

Fig. 11 is a side elevation of the device mounted upon the trailer.

As illustrated in the drawings, my device has a base composed of the middle section 1, and the side sections 2 and 3. Suitably mounted on the rear end of the middle section 1 are the upstanding brackets 4 in which is journaled the shaft 5 on which is keyed the pinion 6, and on which is slidably mounted the collar 7 on which is mounted the spool 8 with the interiorly toothed hub 9 to co-act with the pinion 6, and radial pin 10 for attachment of the operating cable thereto.

Carried in journals 11 on the rear end of section 1 there is the shaft 12 on which is the sprocket-wheel 13 connected by chain 14 with the sprocket-wheel 15 on the shaft 5. At each of its ends the shaft 12 has a spur gear 16 meshing with a gear 17 on a shaft 18 journaled in section 1 and extending from the rear end to the front end of the device. It is to be noted that these two shafts 18 are disposed closely adjacent the outer edges respectively of the middle section 1.

The side section 2 is hinged, at both its front and rear ends, to the middle section 1 by hinges 19, each having the parts 19—a and 19—b on the sections 1 and 2 respectively, attached by the pintle pin 19—c. Rotatably mounted on each pintle 19—c is the circular plate 20 attached to the part 19—b of the hinge 19 on the section 2. About this plate 20 is loosely disposed the peripheral gear 21 having the arcuate slot 22 with end abutments 22—a and 22—b, into which projects the lug 23 on the plate 20. The gear 21 meshes with gear 24 on shaft 18 on the side of the section 1 adjacent section 2.

The side section 3 is hinged, at both its front and rear ends, to the middle section 1 by hinges 25, each having the parts 25—a and 25—b on the sections 1 and 3 respectively, attached by the pintle pin 25—c. It is to be noted that the pintles 25—c of the hinges 25 are disposed considerably higher above the top of section 1 than the pintles 19—c of the hinges 19, for a reason which will presently appear. Rotatably mounted on each pintle 25—c of the hinges 25 is a circular plate 26 attached to the part 25—b of the hinge 25 on the section 3. About this plate 26 is loosely disposed the peripheral sprocket-wheel 27 having the arcuate slot 28 with end abutments 28—a and 28—b, into which projects the lug 29 on the plate 26. The sprocket-wheel 27 is connected by chain 30 with sprocket-wheel 31 on the shaft 18 on the side of section 1 adjacent section 3.

Suitably pivoted on the middle of the rear end of section 1 is the operating lever 32 connected by link 33 with pitman 34 carried in brackets 35 on section 1, to which is attached the lever 36 pivoted in bracket 37 attached to one of the brackets 4 and having the fork 38 pivotally attached to the collar 38′ having a flange-and-slot connection with the collar 7 on the shaft 5. Pivoted on the end of the pitman 34 is the lever 39 having on its outer end the inwardly turned plate 40. The end of the lever 39 below the plate 40 has the inclined shoulder 39—a. This plate 40 is disposed closely adjacent the face of the sprocket-wheel 27 on the hinge 25 at the rear of the device, and on this face of the sprocket-wheel 27 are disposed diametrically positioned lugs 41 and 42 to co-act with plate 40, as will be presently explained.

The lever 32 has a latch 43 co-acting with a rack 44 and having the operating rod 45 with handle 46. A bell-crank lever 47 is pivoted on the lever 32 and attached to the operating rod 45′ from the handle 46 and connected by a link 48 to the bell-crank lever 49 pivoted on an upstanding post 34—a on the end of the pitman 34 and connected by a link 50 with the lever 39.

The shaft 12 is provided with a brake collar 51 about which is disposed a brake band 52 suitably mounted upon the rear edge of section 1 and having the operating rod 53 with which co-acts the cam shoulder 54 on the lever 32.

The base sections 1, 2 and 3 are formed of the sills 1—a, 2—a and 3—a, the front and rear ends 1—b, 2—b and 3—b, sides 1—c, 2—c and 3—c, and tops 1—d, 2—d and 3—d, respectively.

At each of the outer rear ends of the sections 2 and 3, on their tops 2—d and 3—d respectively, there is disposed a fork 55 in which is so pivoted a pole 56 that it may swing downwardly to lie on the base in a fore-and-aft position. A similar fork 55 with post 56′ similarly pivoted therein is disposed at the middle of the rear edge of section 1 on its top 1—d.

At each of the outer front ends of the sections 2 and 3, on their tops 2—d and 3—d respectively, there is disposed a fork 55′ in which is so pivoted a pole 56 that it may swing downwardly to lie on the pole 56 pivoted opposite it, on the rear edge. Symmetrically disposed on either side of the middle of the front end of the section 1, on its top 1—d, there are two forks 55′ in which is pivoted a door frame 57 provided on its top with an upwardly projecting frame 57′. It is to be noted that the post 56′ and the frame 57′ are of the same height and greater than the posts 56. The frame 57 is so pivoted in its forks 55′ that it may swing downwardly to lie on the pole 56′ opposite it.

Suitably pivoted near the bottom of each of the poles 56, the pole 56′ and the frame 57, there is the pitman 58 pivoted in a shoe 59. These shoes 59 are slidably mounted in suitably formed trackways below the tops 1—d, 2—d and 3—d, the pitmans 58 passing through slots 58′ in said tops. As illustrated in Fig. 7, the trackway is formed by the sill 3—a, the side 3—c and cleat 3—a′. Each shoe 59 is provided with a retracting spring 60 and an operating chain 61. These chains 61 are rove about suitable pulleys 62 and pass to a master sprocket-chain 63 passed through the rear end 1—b of section 1 and around the sprocket-wheel 64 on the shaft 12.

I provide a cover C of any suitable flexible material, such as canvas, forming the side and end walls and the roof. This cover C is attached to the poles 56, the pole 56′ and the door frame 57 and its frame 57′. Windows W may be suitably provided, and a door D is provided for the frame 57.

I provide a trailer T consisting of a platform 65 mounted on a single axle with wheels 66. From the axle, I provide a towing tongue 67 for attachment by any suitable means to the rear of an automobile A. I provide a latch 68 to attach the forward end of the platform 65 to the tongue 67. The lower rear edge 65′ of the platform 65 is inclined to facilitate the loading and unloading of the device.

From the foregoing description of the details of construction of my device, its use and operation will be obvious. The camping house being fully set up, as illustrated in Fig. 1, and its base being fixed to the ground by a suitable anchoring means, in order to close the device for transportation, the lever 32 is rocked to vertical position, thus releasing the brake on shaft 12. The springs 60 acting on the shoes 59 cause the poles 56, pole 56′ and frame 57 to swing downwardly, bringing with them the cover C which collapses upon the base. The device is then in the position indicated in Fig. 9. This movement has caused the shaft 12, through chain 63 and sprocket-wheel 64 to rotate clockwise, as viewed in Fig. 4, thereby rotating gear 21 to bring the abutment 22—a up against lug 23 and rotating gear 27 to bring the abutment 28—a into proximity with lug 29, as illustrated in Fig. 9.

It is to be noted that, in order to rock the lever 32, the latch 43 is released from rack 44 by the handle 46 and operating rod 45, which causes lever 39 to raise plate 40 so as to allow it to pass over lug 41, and that as soon as the mechanism is released by the release of the brake, and gear 27 moves as above described, the lug 41 moves away and when the lever 32 is positioned vertically and handle 46 is released, lever 39 and plate 40 are restored to horizontal position, the plate 40 being thus positioned in the path of travel of lugs 41 and 42.

It is to be noted that the rocking of the lever 32, as above described, causes the spool 8 to move on shaft 5, so that its hub 9 is meshed with pinion 6 on shaft 5.

The parts being in the positions indicated in Fig. 9, any suitable form of cable is attached to the pin 10 on hub 9 of spool 8, wound about hub 9, clockwise as viewed in Fig. 4, and its outer end attached to the rear of the automobile A. The automobile is then driven slowly away from the device, thus causing the spool 8 to rotate clockwise as viewed in Fig. 4, thereby actuating the operating mechanism for folding the device. The rotation of shaft 12 causes gear 21 by its abutment 22—a to rotate plate 20 by its lug 23, thus causing the portion 2 to swing upwardly until it has moved through an arc of 90°. When the portion 2 has passed the vertex, it immediately and swiftly swings downwardly to the position illustrated in Fig. 10. This movement of portion 2 is permitted by reason of the slot 22 in gear 21, the lug 23 travelling in this slot 22 from its position immediately against the abutment 22—a, as illustrated in Fig. 9, to the position illustrated in Fig. 10. By reason of the space afforded between the abutment 28—a of gear 27 and lug 29 of plate 26, as illustrated in Fig. 9, the portion 3 begins to rise somewhat after the portion 2 has started, thereby permitting the portion 2 to reach its position on the portion 1, as illustrated in Fig. 10, before the portion 3 reaches the vertex and moves downwardly on portion 2.

It is to be noted that when the portion 3 reaches the position illustrated in Fig. 10, the lug 42 on gear 27 has moved to such position as to engage the plate 40 and cause lever 32 to move from its vertical position to its extreme forward position, thereby moving the spool 8 along the shaft 5 to disengage the hub 9 from the pinion 6, thus rendering the mechanism inoperative and permitting the cable to run off of the spool 8.

The device being now closed, as illustrated in Fig. 10, it may be mounted on the platform 65 of the trailer T, by any suitable means, and the latch 68 attaching the platform 65 to the tongue 67, the trailer T may be attached to the automobile A, for towing, as illustrated in Fig. 11.

It is to be noted that, as illustrated in Fig. 11, when the device is mounted upon the trailer T, the portion 3 on top does not rise sufficiently high to interfere with the driver's vision through the rear window of the automobile A, which is a very distinct advantage of my device over the ordinary type of rigid camping houses towed behind automobiles.

It is believed that the reverse of the foregoing described operation, for erecting the camping house will be entirely obvious. The operating lever 32 is moved to its vertical position to again engage the spool 8 with the shaft 5, and the cable attached and coiled in counter-clockwise position. It is to be noted (Fig. 10) that the parts are so positioned when the device is closed, that when power is applied, the portion 3 begins to rise immediately and portion 2 begins to rise only when portion 3 has moved upwardly sufficient to allow portion 2 to rise.

It is to be noted that after both portions 2 and 3 have been fully opened, as illustrated in Fig. 9, the gears 21 and 27 continue to rotate, so that the sprocket-wheel 64 takes up the chain 63 and thereby causes the posts 56, post 56' and frame 57 to rise, and when the gear 27 has moved so far that its abutment 28—b is brought close to lug 29, its lug 41 contacts plate 40 causing lever 32 to return to its extreme rearward position and cause the brake to engage the shaft 12 to maintain the device in open position.

Having described my invention, what I claim is:

1. A camping house comprising a foldable base, a collapsible and expansible superstructure, and operating mechanism adapted both to fold and unfold said base and to expand and collapse said superstructure.

2. In a camping house, the combination of a sectional base adapted to be folded; poles hinged to said base and having walls and operating roof attached thereto; and means adapted both to fold and unfold said base and also to raise and lower said poles.

3. In a camping house, the combination of a base comprising a plurality of sections hingedly connected; a plurality of poles hingedly mounted on said base and carrying flexible walls and a roof; means adapted both to fold and unfold said sections upon their hinges and to raise and lower said poles.

4. In a camping house, the combination of a base comprising a plurality of sections hingedly connected; a plurality of poles hingedly mounted on said base and carrying flexible walls and a roof; means adapted to fold and unfold said sections upon their hinges; means adapted to raise and lower said poles; and a single actuating means adapted to actuate the means for folding and unfolding and the means for raising and lowering said poles.

5. In a camping house, the combination of a foldable base; swinging posts mounted on said base, said posts adapted to support flexible walls and roof; and an operating mechanism mounted on said base and adapted to fold and unfold said base and swing said posts relative to said base to erect and collapse said walls and roof.

6. In a camping house, the combination of a foldable base; swinging posts mounted on said base, said posts adapted to support flexible walls and roof; and an operating mechanism mounted on said base and adapted to fold and unfold said base and swing said posts relative to said base to erect and collapse said walls and roof, said mechanism having its elements so related that the posts can be moved only when the base is unfolded, and the base can be folded only when the posts are in positions of collapse of the walls and roof.

7. In a camping house, the combination of a foldable base; swinging posts mounted on said base; an operating mechanism mounted on said base and adapted to fold and unfold said base and swing said posts relative to said base; and an actuating drum associated with said mechanism and adapted to be rotated by the pull of a towing cable, from a moving automobile, coiled about said drum.

8. In a camping house, the combination of a base comprising a middle section and two side sections hinged thereto; a plurality of posts hingedly mounted on said base; a shaft journaled on said middle section and having thereon gears and a sprocket-wheel; a sprocket-chain on said wheel and connected with said posts; driving means on the hinges of the side sections and connected with said gears; and means adapted to rotate said shaft.

9. In a camping house, the combination of a base comprising a middle section and two side sections hinged thereto; a plurality of posts hingedly mounted on said base; a shaft journaled on said middle section and having thereon gears and a sprocket-wheel; a sprocket-chain on said wheel and connected with said posts; driving means on the hinges of the side sections and connected with the gears; a second shaft journaled on said middle section and having a driving connection with said first shaft; and a drum on said second shaft adapted to be rotated by a towing cable coiled thereon.

10. In a camping house, the combination of a base comprising a middle section and two side sections hinged thereto; a plurality of posts hingedly mounted on said base; a shaft journaled on said middle section and having thereon gears and a sprocket-wheel; a sprocket-chain on said wheel and connected with said posts; driving means on the hinges of the side section and connected with the gears; a second shaft journaled on said middle section and having a driving connection with said first shaft; a drum slidably mounted on said second shaft and adapted to be rotated by a towing cable coiled thereon; manually operated means adapted to slide said drum to engage said second shaft; and means operated by the movement of one of the side sections and adapted to slide said drum to disengage said drum from said second shaft.

11. In a camping house, the combination of a base; a plurality of posts hinged on said base; a pitman pivoted on each post; a block attached to each pitman and reciprocably mounted in said base; and means adapted to reciprocate said blocks.

12. In a camping house, the combination of a base; a plurality of posts hinged on said base; a pitman pivoted on each post; a block attached to each pitman and slidably mounted in said base; a spring attached to each block to tend to slide it in one direction; and a chain attached to each block by which it can be slid in the opposite direction.

13. In a camping house, the combination of a base; a plurality of posts hinged on said base; a pitman pivoted on each post; a block attached to each pitman and slidably mounted in said base; a spring attached to each block to tend to slide it in one direction; a chain attached to each block by which it can be slid in the opposite direction; and a master chain to which each of said block chains is attached; and means adapted to pull said master chain.

14. In a camping house, the combination of a base; a plurality of posts hinged on said base; a pitman pivoted on each post; a block attached to each pitman and slidably mounted in said base; a spring attached to each block to tend to slide it in one direction; a chain attached to each block by which it can be slid in the opposite direction; a sprocket-chain to which each of said block chains is attached; a sprocket-wheel on which said sprocket chain is wound; an actuating drum adapted to be rotated by the pull of a towing cable from a moving automobile coiled upon said drum; and driving connections between said drum and said sprocket-wheel.

15. A portable camping device adapted to be mounted on a trailer for an automobile comprising a camping house composed of a sectional base and a collapsible superstructure, and operating mechanism mounted on said base and adapted to fold and unfold said base, and also to erect and collapse said superstructure, the house, when folded and mounted upon the trailer, having a width slightly less than that of an ordinary automobile, and a height insufficient to interfere with the rear view from the towing automobile.

16. In a camping house, the combination of a base comprising a middle section and two side sections hinged thereto; and mechanism for folding and unfolding said base adapted to fold one side section over upon the middle section and the other side section over upon the first side section.

17. In a camping house, the combination of a base comprising a middle section and two side sections hinged thereto; and mechanism for folding and unfolding said base adapted to fold said base by swinging each side section upwardly on its hinges through an arc of 90° and then allowing it to move downwardly by gravity through an arc of 90°, and to unfold said base by swinging each side section upwardly on its hinges through an arc of 90° and then allowing it to move downwardly by gravity through an arc of 90°.

18. In a camping house, the combination of a base comprising a middle section and two side sections hinged thereto; and a collapsible superstructure hingedly mounted on the three sections, one of the side sections with the portion of the collapsed superstructure thereon being adapted to be swung through an arc of 180° and lie upon the middle section and the portion of the collapsed superstructure thereon, and the other side section with the portion of the collapsed superstructure thereon being adapted to be swung through an arc of 180° and lie upon the inverted first side section.

19. In a camping house, the combination of a base comprising a middle section and two side sections hinged thereto; a collapsible superstructure hingedly mounted on the three sections; and mechanism for folding the base adapted to cause one of the side sections to move through an arc of 180° to lie upon the middle section, and then to cause the other side section to move through an arc of 180° to lie upon the first side section.

20. In a camping house, the combination of a base comprising a middle section and two side sections hinged thereto; a collapsible superstructure hingedly mounted on the three sections; and mechanism for folding the base adapted to cause one of the side sections to move through an arc of 180° to lie upon the middle section, and then to cause the other side section to move through an arc of 180° to lie upon the first side section, said mechanism being also adapted to collapse said superstructure before folding said base.

RALPH W. GORTON.